UNITED STATES PATENT OFFICE.

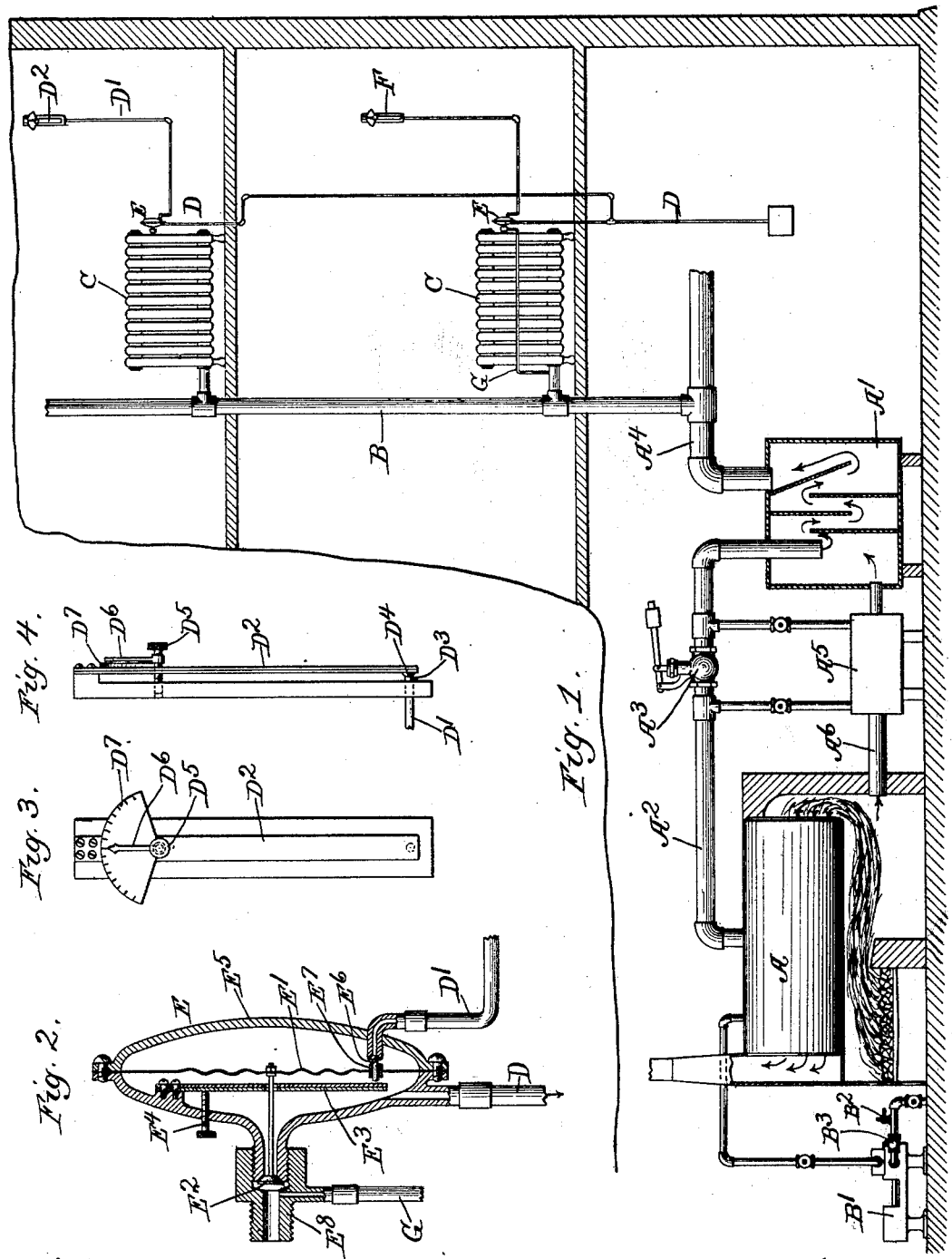

CHARLES G. ARMSTRONG, OF CHICAGO, ILLINOIS, ASSIGNOR, BY MESNE ASSIGNMENTS, TO AUTOMATIC HEATING COMPANY, OF JERSEY CITY, NEW JERSEY, A CORPORATION OF NEW JERSEY.

PROCESS OF REGULATING HEATING SYSTEMS.

SPECIFICATION forming part of Letters Patent No. 716,361, dated December 23, 1902.

Application filed March 4, 1902. Serial No. 96,578. (No model.)

*To all whom it may concern:*

Be it known that I, CHARLES G. ARMSTRONG, a citizen of the United States, residing at Chicago, in the county of Cook and State of Illinois, have invented a certain new and useful Improvement in Processes of Regulating Heating Systems, of which the following is a specification.

My invention relates to a process of regulating heating systems, and has for its object to provide a new and improved process for this purpose.

My invention is illustrated in the accompanying drawings, wherein—

Figure 1 is a diagrammatic view showing one form of apparatus by means of which my process may be carried out. Fig. 2 is a detail view showing one form of valve associated with the thermostat. Figs. 3 and 4 are views of one form of thermostat used in connection with my present system.

Like letters refer to like parts throughout the several figures.

In heating apartments in buildings and the like it is necessary to provide a heater of such capacity as to produce the desired temperature during the coldest weather experienced. As the radiating capacity of the heater to produce the desired temperature during the greater part of the heating season is much smaller than the maximum heating capacity, it is desirable in order to satisfactorily and efficiently heat the buildings to arrange some means for controlling the heat-supply in accordance with the variations of the external atmosphere. By means of my present process this result may be satisfactorily obtained and the heat given out by the heater may be controlled, so as to secure the desired temperature in the apartment at all times during the heating season. If, for example, my process is used in connection with steam-heating, I mix or associate with the water used or with the steam before it enters the heater some fluid or gas which is non-condensing at ordinary temperatures and pressures, such as air or the like, and this mixture or combination of steam and other gas is then permitted to flow into the heater. The steam or vapor in the heater gradually condenses and is replaced by more of the mixture. The non-condensing gas, of whatever nature, thus gradually accumulates in the heater and displaces the heating fluid, thus gradually, as it were, eliminating a part of the heater, or, in other words, gradually reducing the effective radiating capacity of such heater. A suitable means is provided for partially or wholly withdrawing this displacing fluid when desired to prevent a too great lowering of the temperature in the apartment to be heated.

It is of course evident that many different arrangements may be provided for carrying out my process, and for purposes of illustration I have selected the diagrammatic representation of the drawings.

In Fig. 1, for example, I have illustrated the source of steam-supply as the boiler A, said boiler being connected by suitable connections with a riser B, to which are connected the heaters C. Suitable means are provided for introducing into the system a gas non-condensing at ordinary temperatures and pressures—such, for example, as air—and which acts as a displacing fluid in the heaters to displace the steam or other heating fluid, so as to reduce the effective heating area of such heaters. This non-condensing gas may therefore be termed a "displacing" gas or fluid, and such displacing fluid may be introduced into the boiler with the water or may be introduced at some other point, so as to mix with the steam after it has been formed. In Fig. 1 I have shown a pump B' for pumping water into the boiler A. The air or other displacing fluid may be mixed with this water and inserted with it into the boiler, and to facilitate this I may associate with the pump an air-admission cock or valve B², arranged so that any quantity of air may be drawn in with the water, the quantity being regulated by the valve. When this valve is used, I prefer also to use a check-valve B³.

If, for example, the air is to be inserted after the steam is formed, I may provide a suitable mixing-receptacle A', in which the heating fluid and the displacing fluid are mixed or associated together. This mixing-receptacle is preferably interposed between the boiler A and the riser B, although its location may be varied and will depend upon the conditions met. As herein illustrated, the boiler is connected to the mixing-receptacle by the pipe $A^2$, which contains a reduction-pressure valve $A^3$, which may be of any desired form—such, for example, as are now on the market. A pipe $A^4$ leads from the mixing-receptacle to the riser B. A suitable displacing-fluid pump or fluid-moving device $A^5$ may be used to facilitate the introduction of the displacing fluid into the mixer. If, for example, this displacing fluid is air, I may provide a suitable means for raising the temperature of the air before it is mixed with the steam. As herein shown, this result is obtained by drawing a supply of more or less heated air from around the boiler A by means of the pipe $A^6$. In order to facilitate the mixing of the displacing fluid and the heating fluid, I may provide the mixing-receptacle with a series of baffle-plates or other devices for this purpose.

It is evident that my process may be applied to low or high pressure systems and to any of the heating systems now in use and that it may be easily and readily adapted to the conditions presented.

The quantity of displacing fluid used can be varied as the temperature of the outside atmosphere varies, so as to aid in securing a proper control, and this may be done either manually or automatically. If the outside temperature is low, it may be desirable to have less displacing fluid than if said temperature is high, although the quantity of displacing fluid in any case will depend upon the conditions presented and the result desired. It is also evident that this regulating may be done with the hand or by some other means than automatic means—as, for example, by retarding the pump $A^5$ or limiting the amount of air inserted in the boiler or by reducing the capacity of the air-pump, &c.

The mixture of steam and displacing fluid is made to pass along the riser B and into the heater C by any desired agency. Associated with each heater is a suitable exhaust-pipe D, which leads to a suction or exhaust device or which is arranged so that the displacing fluid in the heater may be exhausted or decreased in amount by a hand device or by an automatic device. If the latter device is used, it is preferably responsive to variations in the temperature of the apartment to be heated. I have illustrated such a device at E. When such device is used, it is arranged so that when the temperature in the apartment falls below a predetermined amount it will operate to connect the heater with the escape, exhaust, or suction device, and it is also arranged so that it will break this connection before all of the displacing fluid has escaped or been withdrawn. This result may be produced in any desired manner. In the drawings I have shown one simple and cheap means for accomplishing this result, which may be readily applied to any system. In this construction I use a controlling device E and a device F responsive to variations in the temperature of the apartment to be heated. These two devices may be associated together or may be arranged or disposed in any desired manner and in accordance with the conditions presented. As shown in the drawings, I have placed the controlling device E in proximity to the heater. This controlling device consists of a suitable casing adapted to be connected with the heater and containing a diaphragm $E'$. Associated or connected with this diaphram is a suitable valve $E^2$. The diaphragm $E'$ divides the casing into two chambers and normally stands in a central or middle position, as indicated in full lines in Fig. 2. Located on one side of the diaphragm and on the side communicating with the heater is a thermostatic device $E^3$ of any suitable construction. An adjusting device or screw $E^4$ is associated therewith, so that the position of the thermostatic device may be controlled. The casing $E^5$ of the controlling device is connected to the escape-pipe D, such connection being preferably with the section of the casing containing the thermostatic device. On the other side of the diaphragm the casing is provided with a connection $D'$, which leads to a source of air-supply. In this instance this connection $D'$ leads to the thermostat $D^2$. The diaphragm $E'$ is perforated, and such perforation is provided with a movable part or pin $E^6$, which is smaller than the opening and which controls the connection $D'$. This pin or movable part is actuated by the thermostatic device $E^3$ and is preferably contained within a tube $E^7$ of somewhat larger cross-sectional area. When the controlling device is mounted upon the heater, the parts may be arranged so that it will be far enough from the heater not to be materially affected by the heat thereof. Any suitable means may be provided for preventing this—as, for example, by connecting it by a non-heat-conducting bushing $E^8$ or by placing a shield between the controlling device and the heater. When an ordinary steam-radiator is used, it is found that when the controlling device is placed at the side, as indicated, it will not be unduly affected by the heat, because the cold air from below is continually moving toward the radiator and the heated air rising. In some instances I may provide a connection G, which leads from the portion of the heater containing the steam or from the connecting-pipe and which discharges in proximity to the controlling device or the thermostatic device $E^3$. As shown in Fig. 1, for example, the discharge end of the connecting-pipe G is in proximity to the valve $E^2$, but between it and the heater, so that when the valve is closed no steam can enter the controlling device.

As shown in Figs. 3 and 4, the connection or pipe $D'$ is open at the end $D^3$, and this open end is controlled by the device responsive to variations in the temperature of the apartment. In the present instance this device is the thermostat $D^2$ of any ordinary construction and is provided with a closing part $D^4$, which engages the end of the pipe $D'$, so as to close it when the temperature of the apartment is normal or is below normal. When the temperature rises above the normal, this thermostat moves to open the end of the pipe $D'$. In the present instance I have shown the connection or pipe $D'$ communicating with the atmosphere; but it is of course evident that it might be connected with a source of air-supply under pressure, if desired, the thermostat controlling this connection.

I have described in detail one form of mechanism for carrying out my process; but it is of course evident that many other constructions may be used and that my process may be carried into operation in various ways and by various agencies. I therefore do not limit myself in any particular to the mechanism or apparatus which I have here illustrated.

The thermostat $D^2$ is provided with some suitable regulating device, so that it may be varied to act under different temperatures. Any suitable means for this purpose may be used, and I have shown a screw $D^5$, which passes through it and engages the support. This screw is preferably provided with a pointer $D^6$, passing over a suitable scale $D^7$. By rotating the screw $D^5$ the thermostat may be moved in or out, so as to change the temperature at which it opens the pipe $D'$.

The use and operation of my invention are as follows:

When the heating system is in use, the heating fluid and associated or mixed displacing fluid pass together through the same opening into the heater. The heating fluid gradually condenses and the displacing fluid accumulates in the heater, such accumulation causing a reduction of the space free to be occupied by the heating fluid, thus reducing the effective radiating area. The speed of this process can of course be regulated as desired and will depend upon the conditions presented. When the effective radiating area of the heater has been reduced by the accumulation of the displacing fluid so that the temperature of the apartment to be heated falls below a predetermined amount, a portion of the displacing fluid is removed. If an automatic device for this purpose is used, it is automatically set in operation when the temperature of the apartment falls below a predetermined amount and a portion of the accumulated displacing fluid is withdrawn or allowed to escape. The escape is then shut off or closed, and if not enough has been removed the device in a short time will be again moved to a position to permit more of the fluid to escape or be withdrawn. The amount of fluid thus taken from the heater at a given time may, of course, be varied and may be readily regulated as desired. As the displacing fluid is removed from the heater more space for the steam is secured and the effective radiating capacity is increased. When this effective radiating area is increased so as to produce the desired or a predetermined temperature, the action of the withdrawing device ceases, and the effective radiating area is then gradually reduced by the accumulation of the displacing fluid.

When, for example, the particular controlling device illustrated in the drawings is used, the action is as follows: The mixed heating fluid and displacing fluid is inserted into the heater through the same opening, and the displacing fluid gradually accumulates, so as to reduce the effective heating area of the heater. If now the area occupied by the heating fluid becomes too small to keep the temperature of the apartment at the predetermined point, such temperature falls and the thermostat $D^2$ moves away from the pipe $D'$, thus permitting said pipe to connect with the air. Since the pipe $D$ is connected with a pump or other withdrawing means or device, the air will pass through the pipe $D'$ and enter the casing $E^5$, moving the pin $E^6$ so as to permit its entrance. This movement of the pin is possible because the thermostatic device $E^3$ is now comparatively cool. The air rushing into the casing $E^5$ exerts a pressure on the diaphragm $E'$ and moves it so as to move the valve $E^2$ from its seat. The withdrawing device is now connected with the heater and withdraws some of the accumulated displacing fluid. In order to prevent the withdrawal of too much of this displacing fluid, I provide means for checking the action of the withdrawing device. In the ordinary radiator when the suction device is operating a portion of the steam passes rapidly along the bottom without passing up through all the coils, and hence since the valve $E^2$ is open the suction immediately draws some portion of this steam or heated air or mixture into the casing $E^5$. This steam then strikes the thermostatic device $E^3$, which is made comparatively sensitive at such temperatures, and it at once moves toward the diaphragm, so as to force the pin $E^6$ upon its seat, thus preventing any further entrance of the air through the pipe $D'$. The suction device now draws the air from the section of the casing $E^5$ on the right of the diaphragm through the opening in which the pin $E^6$ rests, so as to relieve the pressure and practically equalize the pressure on each side of the diaphragm. Said diaphragm then straightens and assumes its middle position, drawing the valve $E^2$ closed, so as to disconnect the withdrawing device from the heater. The admission of the steam or vapor or heated fluid is then cut off and the thermostatic device immediately cools, so as to release the pin $E^6$. If now the thermostat on the wall has not moved back and the pipe D' is still open, showing that the temperature of the apartment is still too low, the air will again rush in and the action hereinbefore described be repeated. This process will continue until the thermostat closes the pipe D'. The effective area of the opening in the diaphragm not filled by the pin $E^6$—that is, the opening through which air is withdrawn from that side of the casing into which D' empties—is smaller than the opening in the pipe D', so that the diaphragm E' will have a pressure exerted on it to move it whenever the mouth of the pipe D' is open. It will thus be seen that even if the pipe D is continuously connected with the withdrawing device the controlling device will operate satisfactorily and efficiently. If the pipe G is used, it will be seen that since it is connected directly with the device containing steam the steam will immediately pass into the casing $E^5$ as soon as the valve $E^2$ is open, and I may use this pipe G in the event the heaters are so constructed that the fluid entering the casing $E^5$ does not cause the thermostatic device $E^3$ to act with sufficient speed, for in such event this device may be made to act as quickly as desired by simply varying the size of the pipe G or the amount of material that may pass therethrough.

It will thus be seen that I have here a process by means of which the effective heating area of the heater may be readily controlled, so as to secure the desired temperature in the apartment to be heated.

By inserting the air or other displacing fluid into the system, as herein described, the heating agent is diluted, as it were, the air or other dilutant being carried along by the steam and this diluted heating agent introduced into the heater. The dilutant is allowed or caused to escape from the system when the temperature of the apartment being heated is below a predetermined point, and this escape of the dilutant is checked or cut off when the temperature of the apartment rises to or above said predetermined point. It will further be seen that my process can be cheaply applied to heating systems and when so applied is efficient and economical and insures a proper regulation of temperatures.

I claim—

1. The process of regulating heating systems, which consists in mixing a heating fluid and a displacing fluid, introducing this mixture into the heater, causing the displacing fluid to accumulate in such heater, and then withdrawing a portion of said displacing fluid when the temperature of the apartment to be heated falls below a predetermined point.

2. The process of regulating heating systems, which consists in mixing a heating fluid and a displacing fluid, introducing this mixture into the heater, causing the displacing fluid to accumulate in such heater, withdrawing a portion of said displacing fluid when the temperature of the apartment to be heated falls below a predetermined point, and cutting off the escape of said displacing fluid when the temperature of said apartment rises to or above the said predetermined point.

3. The process of regulating heating systems, which consists in mixing a heating fluid and a displacing fluid, introducing this mixture into the heater, causing the displacing fluid to gradually accumulate, withdrawing a portion of said displacing fluid when the temperature of the apartment to be heated falls below a predetermined point, and intermittently checking the withdrawal of the displacing fluid before the temperature of the apartment rises to or above the said predetermined point.

4. The process of regulating heating systems which consists in mixing a heating fluid and a displacing fluid, introducing this mixture into the heater, causing the displacing fluid to accumulate in such heater, withdrawing a portion of this displacing fluid responsive to variations in temperature in the apartment to be heated.

5. The process of regulating heating systems which consists in mixing a heating fluid and a displacing fluid, introducing this mixture into the heater, causing the displacing fluid to accumulate in such heater, withdrawing a portion of this displacing fluid responsive to variations in temperature in the apartment to be heated, and checking the withdrawal of the displacing fluid independent of the temperature of said apartment.

6. The process of regulating heating systems which consists in mixing steam and air, introducing this mixture into the heater, causing the air to accumulate in such heater, withdrawing a portion of this air responsive to variations in temperature in the apartment to be heated, and checking the withdrawal of the air independent of the temperature of said apartment.

7. The process of regulating heating systems which consists in mixing a heating fluid and a displacing fluid, varying the proportions of the two fluids when the temperature of the external atmosphere varies, introducing this mixture into the heater, causing the displacing fluid to accumulate in the heater and withdrawing a portion of this displacing fluid when the temperature of the apartment to be heated falls below a predetermined point.

8. The process of regulating heating systems, which consists in introducing a diluted heating agent to the radiating system, causing the dilutant thereof to escape from said system when the temperature of the apartment being warmed is below a predetermined point, and cutting off the escape of said dilutant when the temperature of said apartment rises to or above said predetermined point.

9. The process of regulating heating systems, which consists in introducing a diluted heating agent to the radiating system, causing the dilutant thereof to escape from said system when the temperature of the apartment being heated is below a predetermined point and responsive to said lowering of the temperature and cutting off the escape of said dilutant when the temperature of said apartment rises to or above said predetermined point.

CHARLES G. ARMSTRONG.

Witnesses:
FANNY B. FAY,
HOMER L. KRAFT.